(12) United States Patent  
Barth

(10) Patent No.: US 9,128,475 B2  
(45) Date of Patent: Sep. 8, 2015

(54) PARALLELIZED PROGRAM CONTROL BASED ON SCHEDULED EXPIRY OF TIME SIGNAL GENERATORS ASSOCIATED WITH RESPECTIVE PROCESSING UNITS

(75) Inventor: Ramon Barth, Verl (DE)

(73) Assignee: Beckhoff Automation GmbH, Verl (DE)

( * ) Notice: Subject to any disclaimer, the term of this patent is extended or adjusted under 35 U.S.C. 154(b) by 100 days.

(21) Appl. No.: 13/477,622

(22) Filed: May 22, 2012

(65) Prior Publication Data

US 2012/0291035 A1  Nov. 15, 2012

Related U.S. Application Data

(63) Continuation of application No. PCT/EP2010/066172, filed on Oct. 26, 2010.

(30) Foreign Application Priority Data

Nov. 23, 2009 (DE) .......................... 10 2009 047 024

(51) Int. Cl.  
*G06F 9/46* (2006.01)  
*G05B 19/042* (2006.01)  
*G06F 9/48* (2006.01)

(52) U.S. Cl.  
CPC .......... *G05B 19/0421* (2013.01); *G06F 9/4825* (2013.01); *G06F 9/4887* (2013.01); *G05B 2219/2205* (2013.01); *G05B 2219/34407* (2013.01); *G05B 2219/34411* (2013.01)

(58) Field of Classification Search  
CPC .............................. G06F 9/4887; G06F 9/4825  
See application file for complete search history.

(56) References Cited

U.S. PATENT DOCUMENTS

| 6,167,425 | A  | * | 12/2000 | Beckhoff | 718/103 |
| 7,954,103 | B2 |   | 5/2011  | Chen     |         |
| 2004/0117682 | A1 | * | 6/2004 | Xu | 713/400 |
| 2005/0210472 | A1 | * | 9/2005 | Accapadi et al. | 718/105 |

(Continued)

FOREIGN PATENT DOCUMENTS

| DE | 196 48 422 A1 | 6/1998 |
| EP | 1 067 448 A2 | 1/2001 |

(Continued)

OTHER PUBLICATIONS

John M. Calandrino et al. "Litmus$^{RT}$: A Testbed for Empirically Comparing Real-Time Multiprocessor Schedulers" Proceedings of the 27$^{th}$ IEEE International Real-Time Systems Symposium (RTSS'06). 2006. 13 pages.

(Continued)

*Primary Examiner* — Meng An  
*Assistant Examiner* — James J Lee  
(74) *Attorney, Agent, or Firm* — Dorsey & Whitney LLP; Nathaniel P. Longley

(57) ABSTRACT

A processor comprises a plurality of processing units operating in parallel. Each processing unit is associated with a time signal generator upon the expiry of which the corresponding processing unit is capable to set expired time signal generator to a predefined duration of time. In case an end of the predefined duration of time deviates less than a predefined duration of time from a scheduled expiry of a time signal generator assigned to a different processing unit; predefined duration of time is modified.

17 Claims, 5 Drawing Sheets

(56) References Cited

U.S. PATENT DOCUMENTS

| | | | | |
|---|---|---|---|---|
| 2005/0229179 | A1* | 10/2005 | Ballantyne | 718/100 |
| 2006/0004933 | A1* | 1/2006 | Sen et al. | 710/48 |
| 2006/0031588 | A1* | 2/2006 | Sen et al. | 709/248 |
| 2006/0155552 | A1* | 7/2006 | Chen et al. | 705/1 |
| 2006/0208829 | A1* | 9/2006 | Earhart et al. | 333/133 |
| 2007/0288928 | A1* | 12/2007 | Chen | 718/102 |
| 2009/0249343 | A1* | 10/2009 | Thiyagarajan et al. | 718/102 |
| 2009/0259870 | A1* | 10/2009 | Sharma et al. | 713/400 |
| 2010/0077394 | A1* | 3/2010 | Wang et al. | 718/1 |
| 2010/0085084 | A1* | 4/2010 | Kim et al. | 327/108 |

FOREIGN PATENT DOCUMENTS

| | | |
|---|---|---|
| JP | 03-164966 | 7/1991 |
| JP | 11-327928 | 11/1999 |

OTHER PUBLICATIONS

International Search Report issued in connection with International Patent application No. PCT/EP2010/066172. European Patent Office. 2 pages Jan. 31, 2011.

Office action issued in connection with German Patent Application No. 10 2009 047 024.7-53. German Patent Office. 3 pages. Jun. 25, 2010.

Round-robin scheduling. Retrieved from en.wikipedia.org/wiki/Round-robinscheduling on May 21, 2012. 3 pages.

Japanese office action dated Dec. 3, 2013 for application No. 2012-540344 (6 pages).

Chinese office action received Mar. 7, 2014 for application No. 201080053025.8. (7 pages).

English translation of Chinese office action received Mar. 7, 2014 for application No. 201080053025.8. (4 pages).

* cited by examiner

400

| Program | Priority | Waiting time | Status | Ticks |
|---------|----------|--------------|-----------|-------|
| 410 | 5 | 5 | EXECUTING | 0 |
| 420 | 4 | 50 | WAITING | 45 |
| 430 | 3 | 50 | WAITING | 6 |
| 440 | 2 | 100 | HIGH READY | -4 |
| 450 | 1 | 1000 | WAITING | 820 |
| ... | ... | ... | ... | ... |

PARALLELIZED PROGRAM CONTROL BASED ON SCHEDULED EXPIRY OF TIME SIGNAL GENERATORS ASSOCIATED WITH RESPECTIVE PROCESSING UNITS

CROSS-REFERENCE TO RELATED APPLICATIONS

This application is a continuation of International Patent Application No. PCT/EP2010/066172, filed Oct. 26, 2010, which claims priority to German Patent Application No. 10 2009 047 024.7-53, filed on Nov. 23, 2009, the entire contents of all of which are hereby incorporated herein by reference in their entirety.

FIELD

The present invention relates to a control method and to a method for executing a plurality of programs on a plurality of processing units operating in parallel.

BACKGROUND

Machines and facilities are frequently controlled on the basis of control systems programmable from memory (SPS). For this purpose, a microcomputer is generally used in order to execute a program which retrieves the states of a number of sensors connected to the machine or facility, respectively, and accesses a number of actuators connected to the machine or facility, respectively, on the basis of the determined states. Complex machines or facilities, respectively, may comprise a plurality of sensors and actuators and make high demands on the performance of the microcomputer.

In order to control the machine or facility, respectively, the microcomputer frequently executes a number of programs in parallel. The programs may interact with each other or be independent from each other. Different programs make different demands to the microcomputer, e.g. when it comes to a minimum guaranteed response time to a status change of a sensor or to the frequency of a sampling of a sensor or, as the case may be, to outputting an actuator value.

Up to a certain degree, the increased demands to the control system may be met by means of a microprocessor which is clocked faster in the microcomputer. Due to the physical conditions, this kind of power enhancement, however, cannot be increased as desired so that current microprocessors predominantly rely on several computing cores operating in parallel in order to increase their power. Methods used in the past for controlling a defined sequence of several programs for controlling machines by means of only one computing core are hardly suitable for distributing programs to a plurality of computing cores.

DE 196 48 422 C2 proposes to alternately distribute an available computing time of a computing core to a real-time capable program for controlling such a machine and to a non-real-time capable operating system by means of a time-slice control. The proposed time-slice control is controlled by means of a programmable timer which causes an interrupt (INT) in the computing core upon expiration of a predefined amount of time. The computing time allotted to the operating system may be determined independently from the computing time allotted to the control program.

SUMMARY

The present invention generally relates to a method and a system in order to carry out several programs for controlling a machine on a plurality of processing units operating in parallel.

One embodiment of the invention provides a control method for executing programs on a plurality of processing units operating in parallel. Each processing unit is associated with a time signal generator upon the expiry of which the control method is carried out on the associated processing unit. The control method comprising selecting a program available for execution on the processing unit; setting the expired time signal generator to a predefined duration of time; and starting the selected program on the processing unit.

Another embodiment of the invention provides a control method for executing programs on a plurality of processing units operating in parallel. Each processing unit is associated with a time signal generator upon the expiry of which the control method is carried out on the associated processing unit. The control method comprising setting the expired time signal generator to a predefined duration of time; comparing whether an end of the predefined duration of time deviates less than a predefined duration of time from a scheduled expiry of a time signal generator assigned to a different processing unit and modifying the predefined duration of time, if this is the case.

Another embodiment of the invention provides a processor comprising a plurality of processing units operating in parallel. Each processing unit is associated with a time signal generator upon the expiry of which the corresponding processing unit is capable to set expired time signal generator to a predefined duration of time. In case an end of the predefined duration of time deviates less than a predefined duration of time from a scheduled expiry of a time signal generator assigned to a different processing unit; predefined duration of time is modified.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any processor.

Figure 1:
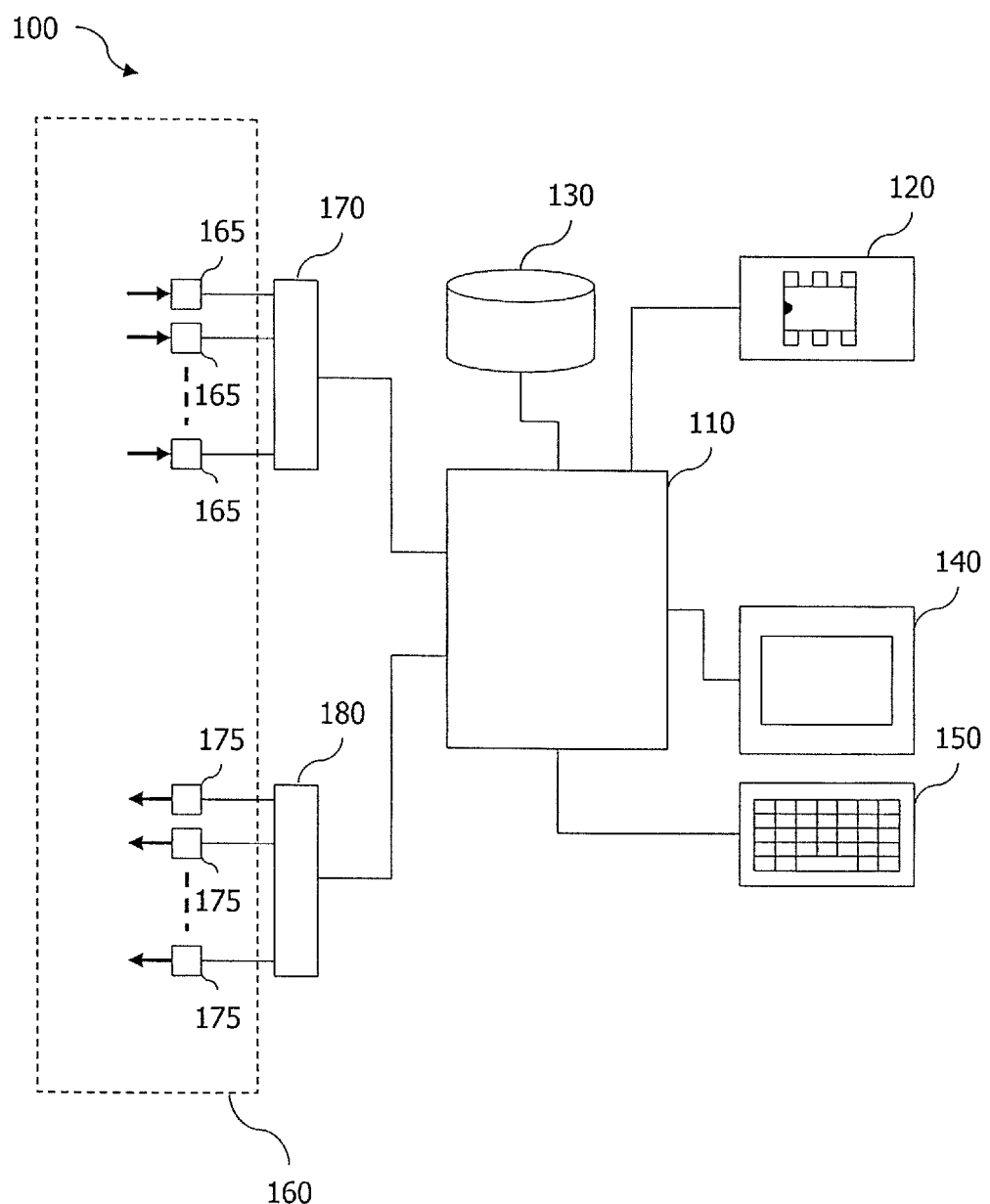
FIG. 1 shows a schematic overview of a controlled technical facility.

FIG. 1 depicts a schematic overview of a controlled technical facility 100. The controlled technical facility 100 comprises a microcomputer 110 which is connected to a main memory 120, a read-only memory 130, a display 140 and to an input device 150 in a known manner. The microcomputer 110 usually comprises at least one microprocessor (processor, central processing unit, CPU) and various additional components such as a voltage supply and interfaces to the main memory 120 and to the read-only memory 130. The display 140 and the input device 150 are provided to allow a user to operate the microcomputer 110. A use of the microcomputer 110 may optionally or additionally be effected by means of an access via a network interface and a further computer system connected thereto. In one embodiment, the display 140 and the input device 150 may accordingly be omitted.

A production machine 160 comprises a plurality of sensors 165 connected to a sensor interface 170, as well as a plurality of actuators 175 connected to an actuator interface 180. The interfaces 170 and 180 are each connected to the microcomputer 110. A real-time capable network may be provided in order to connect the sensors 165 to the sensor interface 170 or, respectively, to connect the actuators 175 to the actuator interface 180 and/or the interfaces 170 and 180 to the microcomputer 110, e.g. EtherCat.

The depicted production machine 160 represents any desired machine or facility controlled by the microcomputer 110. The production machine 160 may e.g. be a CNC machine tool or a rolling mill for producing sheet steel. In alternative embodiments less than the depicted sensors 165 and/or actuators 175 may be comprised. The sensors 165 may be analogue and/or digital sensors, e.g. in the form of path sensors, light sensors, temperature sensors, speed sensors, sonic or other sensors. In a complex production machine 160, the number of sensors 165 may be more than 100. The actuators 175 may realize analogue and/or digital actuator values, e.g. in the form of valves, drives, light and thermal controls, and other actuators. A complex production machine 160 may comprise actuators for controlling 80 axes or more.

The computer system consisting of the components 110-150 samples the sensors 165 and controls the actuators 175 depending on the sampled values. Depending on the configuration of the production machine 160, one or several programs run on the computer system 110-150 in order to determine the activation of the actuators 175.

Figure 2:
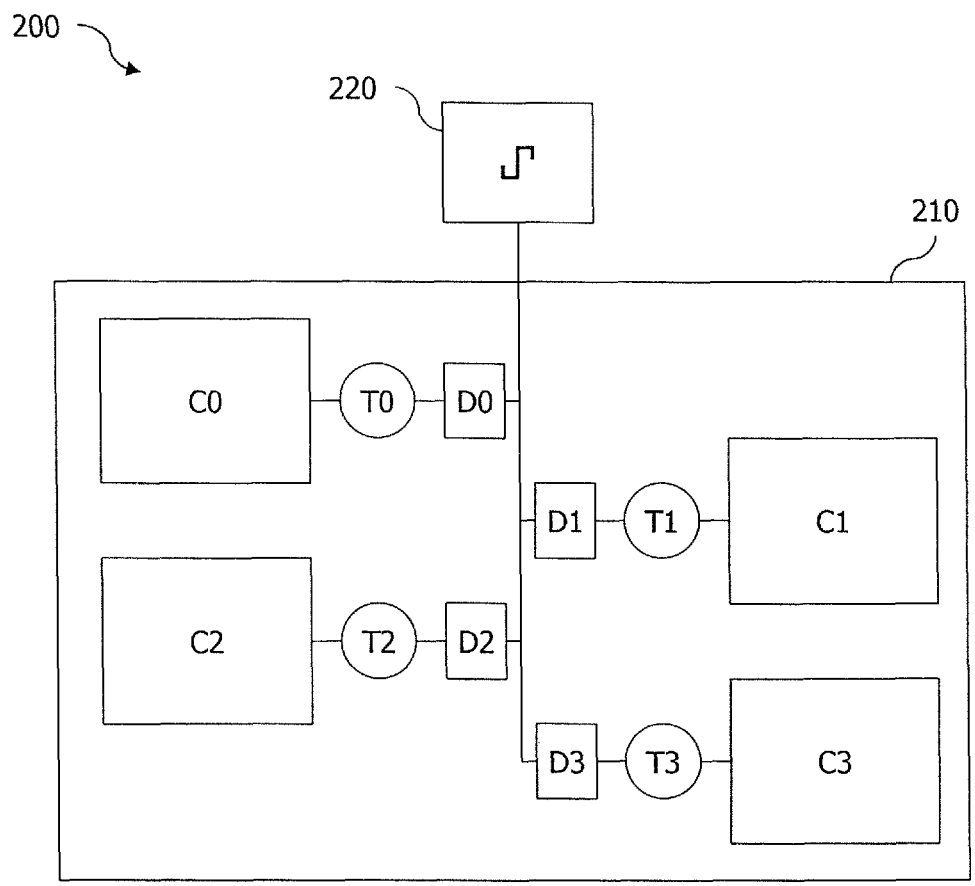
FIG. 2 shows a schematic view of a processor of FIG. 1.

FIG. 2 shows a schematic view of a processor 200 of the microcomputer 110 of FIG. 1. The processor 120 comprises a housing 210 in which four computing cores C0-C3 are arranged. In other embodiments, a different number of computing cores C0-C3 may be comprised by the processor 200, typical numbers of computing cores C0-C3 in a processor 200 are 2, 4, 8, 16 or 32. There is no upper limit for computing cores C0-C3 in the processor 200; moreover the number of computing cores C0-C3 in the processor 200 does not have to be a power of two. The computing cores C0-C3 may be physically implemented in the processor 200 or provided by a virtual technique such as hyper-threading. Each of the computing cores C0-C3 is connected to a counter T0-T3 assigned to it, the counter being in turn connected to dividers D0-D3 assigned to it. All dividers D0-D3 are connected to a shared clock generator 220. The clock generator 220 may e.g. be located in the microcomputer 110 of FIG. 1 or, in an alternative embodiment, within the housing 210 of the processor 200. In a preferred embodiment, clock signals used for pulsing the computing cores C0-C3 and the clock signal provided by the clock generator 220 are derived from a shared clock signal.

Each of the computing cores C0-C3 may access the counter T0-T3 and the divider D0-D3 assigned to it in a write operation and, preferably, also in a read operation. By means of a write operation carried out by the assigned computing core C0-C3, the dividers D0-D3 may be programmed to a divisor so that the clock signal provided by the clock generator 220 is divided by the programmed divisor in its frequency and the resulting clock signal is provided to the respective counter T0-T3.

The counters T0-T3 are decrementers which cause an interrupt in the associated computing core C0-C3 when the status of the counter has reached zero. The counter status which is a starting point for decrementing may be written to the counter T0-T3 by the associated computing core. In a preferred embodiment, the counters T0-T3 may also be stopped and started by the associated computing core.

The association of the dividers D0-D3 and the counters T0-T3 with the computing cores C0-C3 is transparent which means that a program running on one of the computing cores C1 to C3 only has access to the divider D0-D3 and to the counter T0-T3 associated with the computing core C0-C3 on which the program is running. The program commands for accessing the associated divider D0-D3 and counter T0-T3 are identical for all computing cores C0-C3. Due to the architecture of the processor 200, it is not possible to access a divider D0-D3 or a counter T0-T3 of a different computing core C0-C3.

If e.g. a program running on the computing core C1 is to write into the counter T0 associated to the computing core C0, the program running on the computing core C1 either has to ensure that it changes the computing core to be carried out on the computing core C0, or the program running on the computing core C1 has to contact a further program running on the computing core C0 so that the latter program carries out the desired access to counter T0.

If an interrupt occurs on one of the computing cores C0-C3, a control program (scheduler) is accessed on the respective core C0-C3, e.g. by preliminarily setting an interrupt vector, the scheduler selecting a program which is to be executed on the corresponding computing core C0-C3. Subsequently the control program re-sets the assigned counter T0-T3 and/or the assigned divider D0-D3 and starts the selected program. In this way, a time-slice mechanism is implemented which only provides a limited computing time to the selected program before a new interrupt again accesses the control program, and the control program examines which program is to be continued in the following.

The control program is the same for all computing cores C0-C3. As a result, the control program allocates the computing core C0-C3 which was interrupted last by its assigned counter T0-T3 to a program which is available for executing on said computing core C0-C3. Thus, a time-slice mechanism is implemented in order to run a number of programs on the plurality of computing cores C0-C3 in a distributed manner. By selecting a program to be executed locally on the respective computing core C0-C3 on which the control program is run, the control program is effectively carried out on all computing cores C0-C3, thus already achieving a load distribution of programs to the computing cores C0-C3 and a complex method for controlling all programs being executed in the processor 200 by a central control program run on one single computing core is no longer necessary.

Figure 3:
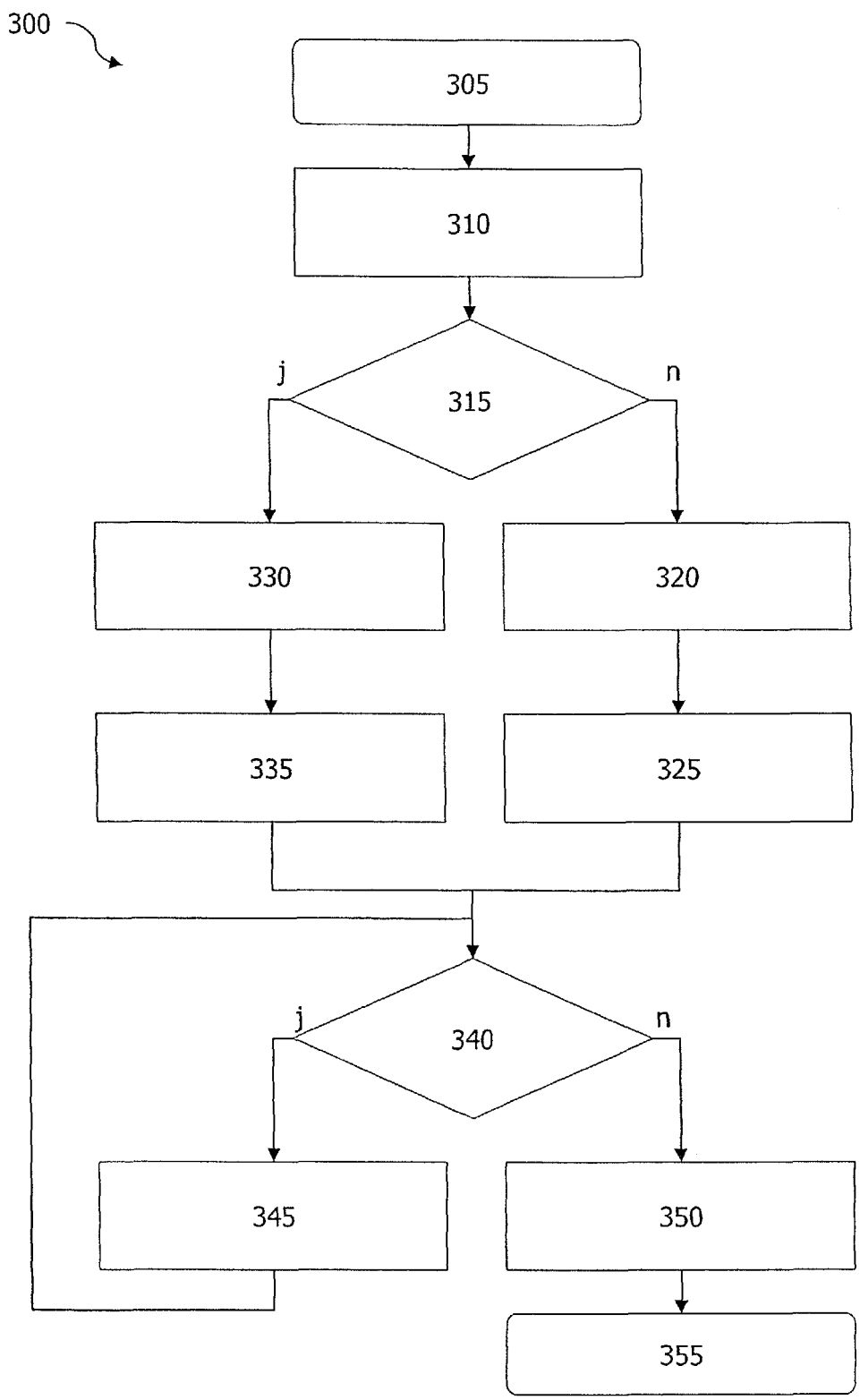
FIG. 3 depicts a flow chart of a method for execution on the processor of FIG. 2.

FIG. 3 shows a flow chart of a method 300 for execution on the processor 200 of FIG. 2 in the microcomputer 110 of FIG. 1. The method 300 represents the essential steps of the control program (scheduler) described above with reference to FIG. 2.

In the first step 305, the method 300 is in its initial state. Step 305 is the first step carried out by the method 300 after the method 300 has been accessed, e.g. by an interrupt of one of the counters T0-T3 from FIG. 2. In a following step 310, the method 300 first blocks further accesses of the method 300 in order to prevent that several instances of the method 300 run in parallel on a plurality of the computing cores C0-C3. Blocking may e.g. be effected by means of a known synchronization mechanism of the processor 200, such as a semaphore or a corresponding register, which is provided to coordinate competing accesses of the computing cores C0-C3 to resources which cannot be utilized simultaneously. Step 310 is required only if the method 300 provides services exceeding the allocation of programs to computing cores C0-C3 and prohibiting parallel execution of the method 300. Such services may e.g. include an allocation of exclusively used resources, such as the read-only memory 130, to programs running on the computing cores C0-C3. For the mere allocation of a program to a computing core C0-C3, a number of simultaneously running methods 300 may possibly be allowed on different computing cores C0-C3 and the blocking described in step 310 is not required.

In a following step 315, it is examined if a real-time capable program or a non-real-time capable operating system is next to be carried out on the respective computing core C0-C3. The method 300 is configured in such a way that in case of successive accesses of the method 300 on the same computing core C0-C3, the operating system and a real-time capable program are executed in an alternating manner. If a real-time capable program is to be carried out, the method 300 branches off into a step 320 and selects an entry from a table allocated to the computing core C0-C3 on which the method 300 is carried out, the entry representing one of potentially a number of programs available for execution on the computing core C0-C3, as described below in more detail with reference to FIG. 4.

In a following step 325, it is determined which duration of time is provided to the selected program before the method 300 is accessed again in a time-controlled manner in order to carry out a new allocation of a program to the computing core C0-C3.

If, however, it is determined in step 315 that the operating system is to be carried out, the method 300 branches off into step 330 and selects the operating system as the next program to be executed. The operating system may coordinate other programs, the allocation of which to one of the computing cores C0-C3 is not controlled by the method 300 but by the operating system itself. Such programs depending on the operating system are executed within the time frame provided to the operating system by the control program of the method 300. In analogy to the above-described step 325, it is determined in the following step 335 which duration of time is assigned to the operating system for execution.

After carrying out steps 325 and/or 335, the method continues in step 340 which examines whether an end of the defined duration of time collides with an end of a different duration of time to which one of the timers T0-T3 is programmed. For this purpose, expiry times of all counters T0-T3 may be stored in a memory area which may be accessed by each of the computing cores C0-C3.

In this context, a collision of the ends of the time durations means that the end of the time durations determined in one of the steps 325 or 335 is closer to a point in time at which one of the timers T0-T3 expires and at which the method 300 is accessed than has been predetermined. This predetermined extent at least corresponds to a time usually required by the method 300 for a one-time execution.

If step 240 determines a collision of the end of the predefined time duration with the end of another time duration, the predefined time duration is adjusted in step 345. For this purpose, the predefined duration of time may be increased or decreased by a predetermined value. The heuristics used in step 345 for adjusting the predetermined time duration may also take into account a periodicity of the points in time at which the counters T0-T3 cause interrupts. In one embodiment, the steps 340 and 345 are repeated until an adjustment of the duration of time has been achieved which ensures that collisions will not occur. The usual protective steps for preventing an endless loop of the steps 340 and 345 may be used.

In a step 350, the counter T0-T3 associated with the computing core C0-C3 on which the method 300 is run, is set to a value corresponding to the predetermined duration of time.

Eventually in a step 355, the blocking set in step 310 is removed so that further accesses of the method 300 become possible, and the program or operating system selected in one of steps 320 or 330 is started. Preferably, both these actions are inseparably carried out in one single step so that the method 300 is not re-started before the selected program or, respectively, the operating system is started on the computing core C0-C3.

Figure 4:
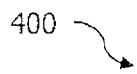
FIG. 4 shows an exemplary process table for the method of FIG. 3.

FIG. 4 shows an exemplary process table 400 for use with the method 300 of FIG. 3. An individual process table 400 is assigned to each of the computing cores C0-C3 of FIG. 2. By entering a program 410-450 into the process table 400, an allocation of the program 410-450 to the respective computing core C0-C3 is carried out.

Programs 410 to 450 are recorded in table 400. Each entered program 410-450 is assigned a priority, a waiting time, a status and a number of time steps. The priority indicates the urgency with which the program 410-450 is to be carried out, a high priority corresponding to a high urgency. Of a number of programs 410-450 available for execution, the program 410-450 which has the highest priority is chosen by the control program of the method 300. The waiting time of the program 410-450 indicates how much time is to pass by between successive accesses of the program 410-450. The waiting time is usually indicated in units of a system clock adjustable for the computing core C0-C3, wherein the system clock may amount to 10 µs to 100 ms, preferably to 100 µs to 1 ms. In one embodiment, the system clock is set to the shortest waiting time of all programs 410-450 recorded in table 400. It may furthermore be provided to synchronize the system clock with another clock e.g. in order to simplify a communication with another processing system which may be integrated in the production machine 160 of FIG. 1. Thus, a plurality of distributed clock generators or, respectively, clocks may be provided within the framework of the technical facility 100 which provide time bases for differing control processes. The synchronization may e.g. take place by inserting waiting cycles.

The status of a program 410-450 indicates whether the program 410-450 is available for execution, waiting or being executed. If the status of a program 410-450 is HIGH READY, it has waited for execution long enough and is ready to be executed. If the program 410-450 does not require any computing time and waits for its next access, the status is WAITING. If the program 410-450 is carried out, its status is EXECUTING. The number of time steps of each program 410-450 is decremented by 1 with each system clock.

If the number of time steps of a program 410-450 reaches zero, the status of the program 410-450 is set to HIGH READY. However, the time steps continue to be counted until the program 410-450 is selected for execution by the control program of the method 300 of FIG. 3. The status of the program 410-450 is then set to EXECUTING and the number of time steps of the program 410-450 is set to its waiting time.

A change of status of a program 410-450 from WAITING to HIGH READY does thus not immediately result in the execution of the program 410-450 on one of the computing cores C0-C3 of FIG. 2. Instead, the status of the program 410-450 signals its feasibility, and during the next access of the control program of method 300, that program 410-450 is executed the status of which is HIGH READY and which at the same time has the highest priority.

If the executed program 410-450 has completed its task and does not require any further computing time until it is accessed for the next time, the program 410-450 accesses the control program of method 300 of FIG. 3. The status of the program 410-450 in the process table 400 is set from EXECUTING to WAITING.

In one embodiment, an allocation of a program 410-450 to a table 400 or, respectively, to a computing core C0-C3 is effected by the control program of the method 300. The control program documents for each access which program 410-450 is selected when. If no program 410-450 can be selected because none is available for execution, an idle time of the computing core is documented. The control program determines a capacity utilization of the computing core from the documented working times and idle times and, if required, allocates a program 410-450 to a computing core C0-C3 the capacity utilization of which was lower than that of other computing cores C0-C3.

The allocation may also be carried out in such a way that a minimal number of computing cores C0-C3 exhibit as high a capacity utilization as possible so that the remaining computing cores C0-C3 are used not at all or only to a small extent and may be transferred into an energy-saving mode.

In a further embodiment, an allocation of a program 410-450 to a table or, respectively, to a computing core C0-C3 is carried out manually by a user of the microcomputer 110. As explained above, the control program of the method 300 may nevertheless collect corresponding documenting entries on the basis of which the user may carry out the allocation. As a supporting means, the documented data may be processed, e.g. in the form of lists or graphically. In one alternative, the degrees of capacity utilization of a plurality of computing cores C0-C3 are represented to the user as a progression of time, as the case may be together with average degrees of capacity utilization of the computing cores C0-C3. An allocation of a program 410-450 to a table 400 or, respectively, to a computing core C0-C3 may be changed during operation of the microcomputer 110 of FIG. 1, allowing for an adjustment to fluctuating conditions or demands of the microcomputer 110.

Both approaches may also be carried out in parallel, e.g. by a user manually allocating some programs 410-450 to a table or, respectively, a computing core C0-C3, and by the control program of the method 300 automatically allocating other programs to a table or, respectively, a computing core C0-C3.

Figure 5:
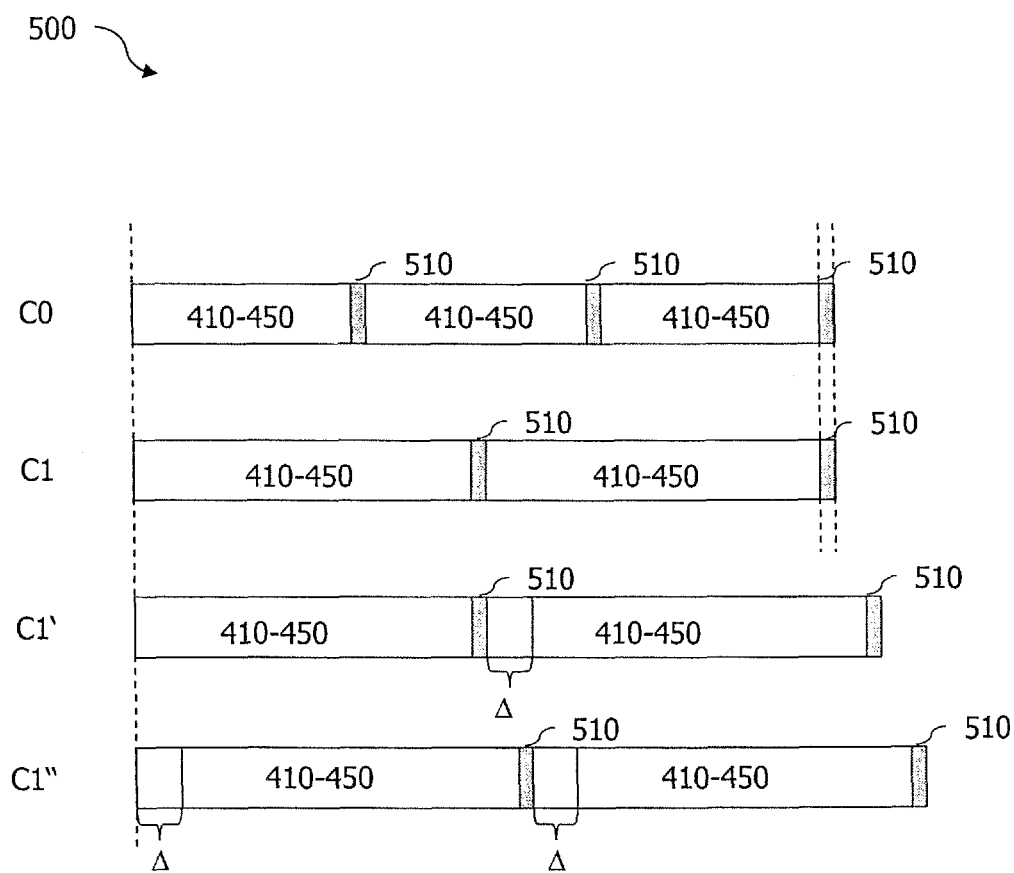
FIG. 5 depicts various heuristics for preventing collisions of the ends of set time durations on the processor of FIG. 2.

FIG. 5 shows various heuristics for preventing collisions of the ends of set time durations on the processor 200 of FIG. 2. A time progression is indicated in a horizontal direction. In a vertical direction, four rows of execution sequences of a program 410-450 and of an operating system 510 are indicated on an exemplary computing core C0 or C1. Dark areas represent a configuration of an operating system, bright areas an embodiment of a real-time capable program 410-450.

At each change between a bright and a dark area, the control program of the method 300 of FIG. 3 is accessed. When compared to the times used by the operating system and the real-time capable program 410-450 on the respective computing core C0-C3, the execution times of the method 300 are so small that they are not indicated in the depiction of FIG. 5.

The first row depicts a sequence of configurations of the operating system and of a real-time capable program 410-450 on the computing core C0. The second row shows a corresponding sequence of configurations of the operating system and of a real-time capable program 410-450 on the computing core C1. The dotted vertical lines connecting the two rows show points of collision of the accesses of the method 300 on computing cores C0 and C1.

In the third row, the progression of the second row is shifted along the time axis by a certain value. This shift is caused by the fact that the time duration assigned to the program 410-450 is lengthened by a predefined time Δ in order to prevent a collision at the right end of the depiction of FIG. 5 (dotted vertical lines). The insertion of time Δ is only carried out once.

The fourth row outlines an alternative approach for preventing collisions. Here, the duration of time assigned to the program 410-450 is lengthened by the time Δ upon any expiry of the time duration assigned to the program 410-450.

The heuristics for preventing collisions following the third row appears easier since only the next access of the method 300 on the other computing core C0 is considered.

The approach following the fourth row has the advantage that the cycle times respectively resulting as the sum of the time duration assigned to the operating system and the duration of time assigned to the program 410-450 may be pitched against each other.

Depending on the ratio the cycle times of the progressions of the first and second rows have with regard to each other, the approach of the third and fourth row may be chosen in order to prevent temporal collisions of the method 300 on the computing cores C0 and C1. A combination of both heuristics is possible, as well, e.g. by rendering the cycle times linearly dependent in a first adjustment and by a one-time shift against each other in a second adjustment.

Generally, a time signal generator is assigned to each of a plurality of processing units operating in parallel, a control process for executing programs being carried out on the assigned processing unit when the time signal generator expires. In this context, the control method comprises the steps of selecting a program available for execution on the processing unit, of setting the expired time signal generator to a predefined duration of time, and of starting the selected program on the processing unit.

In this manner it may be achieved that upon expiry of a time duration controlled by the time signal generator, the control method is accessed respectively on the processing unit on which a change of the program being executed is to be controlled. Thus, a conventional microprocessor comprising a plurality of processing units may be used in which it is provided that a program may only be initiated on one of the processing units of the microprocessor by means of control commands which are executed on said processing unit. Particularly microprocessors of the x86 type comprising a plurality of computing cores are configured in such a way and may advantageously be used in order to execute the control method.

In order to control, according to conventional methods, an initialization of a program on a first processing unit of the microprocessor by means of a control program running on a second processing unit of the microprocessor, a lot of time and effort is required which usually necessitates starting a further control program on the first processing unit as well as a communication between the two control programs. Due to the synchronization effort involved therewith, both processing units will not be available for executing other programs of the microprocessor for a relatively long duration of time; as a result, not the entire computing power of the microprocessor can be used.

The program available for execution may have real-time capability and, in addition, a non-real-time capable operating system may be provided for execution in the computing core. When successively executing the control method on the same processing unit, the real-time capable program and the non-real-time capable operating system may alternately be selected.

By accordingly choosing the predefined durations of time to which the time signal generator is set, a duration of time may be assigned to the selected program or operating system, respectively, during which the processing unit may be utilized by the program or operating system, respectively. Thus, the intervals at which the program is accessed, the maximum waiting time of a program for its execution and how much computing time is at the disposition of the program once it has been accessed may be influenced. In parallel to the execution of the program, the non-real-time capable operating system may be used for carrying out standard tasks such as inputting or, respectively, outputting program data to a hard disk or on a display. The operating system or, respectively, programs controlled by it may run in parallel on one or several computing cores.

The durations of time may be set freely within liberal boundaries. The predefined time durations of the operating system and of the real-time capable program may complement one another to result in a cycle time which is assigned to the processing unit. Different processing units may comprise different associated cycle times. A ratio at which a cycle time is distributed to the operating system and to the real-time capable program may e.g. be modified on the basis of a parameter. This parameter may be modifiable during operation of the processing unit or, respectively, of the microprocessor in order to take variable load conditions of a machine controlled by the program into account.

Prior to setting the expired time signal generator to the predetermined duration of time, the predetermined duration of time may be adapted in such a way that the scheduled end of the time duration does not deviate from a scheduled expiry of the time signal generator of a different processing unit by less than a predefined duration of time. It may thus be safeguarded that the control method is not accessed by more than one processing unit at the same time. This is particularly advantageous if the control program carries out further tasks which are required for coordinating a number of programs on the plurality of processing units, and which exclude a concurrence of several instances of the control program. Such tasks may e.g. comprise assigning shared resources to the program or, respectively, to the operating system or controlling a communication between programs.

By adjusting the predefined duration of time as described, a total output of the processing units may be maximized by avoiding that a processing unit has to wait before carrying out the control program.

The adjustment may be effected by a one-time modification of the scheduled duration of time; alternatively, a predefined duration of time assigned to the program may be modified so that the adjustment takes effect in all following accesses of the program. The cycle time of the associated computing core may be changed as a result, so that sustainably less collisions with cycles of other processing units occur. Particularly cycle times the ends of which collide periodically may thus be avoided, making an adjustment less probable in each single case.

The control method may comprise a preceding step of avoiding further accesses of the control method as well as a concluding step of enabling further accesses of the control method. If the control method is not to be executed on a plurality of processing units in parallel, as is described above, these steps may serve as an additional safeguard against processing errors.

Due to the thus generated multiple accessibility of the control program at the same time, the control program may e.g. be accessed on the basis of events which occur in an asynchronous manner with regard to the time signal generators, e.g. by actively accessing a program running on a processing unit.

A list may be assigned to each processing unit, in which programs are listed which are available for execution on said processing unit. Selecting the program is then effected under the entries on said list. Thus, an individual program may be assigned to a specific processing unit. Programs which preferably are to run in parallel may be assigned to different processing units, while programs which are preferably to be carried out in a sequential manner may be assigned to the same processing unit. In this way, dependencies between the programs which are e.g. caused by a machine controlled by a number of programs may be taken into account.

The allocation of a program with a processing unit may be carried out by a user so that a system knowledge of the user may be used; in a further embodiment, the allocation may be carried out by means of the control program, wherein the control program e.g. uses a previous capacity utilization of at least one of the processing units as a decisive basis for the allocation. By means of the allocation by the control program, a uniform capacity utilization of the processing units may be achieved. It is furthermore possible to partially or completely exempt one of the processing units from executing programs or, respectively, the operating system so that the processing unit may be set to an energy saving mode.

The programs' entries in the list may comprise a priority of the program and selecting the program may be carried out on the basis of the priority. It may thus be rendered possible that a high-priority program squeezes a low-priority program from a computing core. By taking priorities into account, time provisions of a controlled machine may be adhered to, thus potentially increasing flexibility and reliability of the control system. As the lists are only evaluated locally for the respective computing core, programs having differing priorities may simultaneously be carried out on different computing cores.

The control method may be run on a computer system in the form of a computer program product or be stored on a computer-readable recording device.

Generally, a system for executing a number of programs comprises a plurality of processing units, a time signal generator being associated to each processing unit, as well as the above-described control method. The processing units may be comprised by an integrated circuit. In particular, the processing units may comprise computing cores (cores) or virtual computing cores such as used e.g. for hyper-threading. As a result, use can be made of the tightly-knit interlinking of the processing units on the integrated circuit so that e.g. a control of a complex technical facility may be accomplished more efficiently by means of a plurality of programs connected to one another.

The time signal generators may be implemented as counters operating on a clock signal, wherein each counter causes an interrupt (INT) in the processing unit it is associated with as soon as the counter reaches a predetermined value. In particular, the counter may count down and the predetermined value may be zero. Such counters have already been provided in current microprocessors comprising a plurality of processing units.

Each counter may comprise a programmable divider for dividing a system clock which is the same for all counters into a clock signal assigned to the counter. By means of this, all time durations are derived from the same time base and have known ratios with regard to one another. By selecting the value to which a counter is set and by accordingly programming the associated divider, the time duration of the counter may be set within liberal boundaries so that a flexible system for processing programs with strongly differing demands may be accomplished.

While the foregoing is directed to embodiments of the invention, other and further embodiments of this invention may be devised without departing from the basic scope of the invention, the scope of the present invention being determined by the claims that follow.

The invention claimed is:

1. A control method for executing programs on a plurality of processing units operating in parallel, each processing unit being associated with a respective time signal generator upon expiry of which the control method is carried out on the processing unit associated with the respective expired time signal generator, the control method comprising:
   selecting a program from a plurality of programs available for execution on the processing unit associated with the respective expired time signal generator;
   determining a predefined duration of time being provided to the selected program before the control method is accessed again on the associated processing unit;
   setting the respective expired time signal generator to the predefined duration of time;
   starting the selected program on the associated processing unit;
   determining whether an end of the predefined duration of time collides with an end of a different duration of time of the respective time signal generator assigned to a different processing unit;
   modifying, if a result of the determining is positive, the predefined duration of time by taking into account a periodicity of points in time at which each processing unit is interrupted; and
   preventing further accesses of the control method to another of the processing units when executing the control method on the processing unit associated with the respective expired time signal generator.

2. The control method of claim 1, wherein the program available for execution is real-time capable, wherein a non-real-time capable operating system is additionally available for executing, and wherein for successive executions of the control method on a same processing unit the real-time capable program and the non-real-time capable operating system are selected in an alternating manner.

3. The control method of claim 2, wherein predefined durations of time of the non-real-time capable operating system and of the real-time capable program complement each other to result in a cycle time being assigned to the processing unit associated with the respective expired time signal generator.

4. The control method of claim 1, wherein modifying the predefined duration of time comprises a shift by a fixed value in the predefined duration of time.

5. The control method of claim 1, a list being assigned to each processing unit, in which the programs assigned to this processing unit are listed, and selecting taking place under the entries in said list.

6. The control method of claim 5, each entry comprising a priority and selecting being effected depending on the priorities.

7. The control method of claim 6, further comprising:
   entering a program into one of the lists on the basis of a past capacity utilization of at least one of the processing unit.

8. A control method for executing programs on a plurality of processing units operating in parallel, each processing unit being associated with a respective time signal generator upon the expiry of which the control method is carried out on the processing unit associated with the respective expired time signal generator, the control method comprising:
   selecting a program from a plurality of programs available for execution on the processing unit associated with the respective expired time signal generator;
   determining a predefined duration of time being provided to the selected program before the control method is accessed again on the processing unit associated with the respective expired time signal generator;
   setting the respective expired time signal generator to the predefined duration of time starting the selected program on the processing unit;
   comparing whether an end of the predefined duration of time deviates less than a predefined length of time from a scheduled expiry of a time signal generator assigned to a different processing unit; and
   modifying the predefined duration of time, if a result of the comparing is positive, by taking into account a periodicity of points in time at which each processing unit is interrupted;
   preventing further accesses of the control method to another of the processing units when executing the control method on the processing unit associated with the respective expired time signal generator.

9. The control method of claim 8, wherein modifying the predefined duration of time comprises a shift by a fixed value in the predefined duration of time.

10. The control method of claim 8, wherein the program available for execution is real-time capable, wherein a non-real-time capable operating system is additionally available for executing, and wherein for successive executions of the control method on a processing unit the real-time capable program and the non-real-time capable operating system are selected in an alternating manner.

11. The control method of claim 10, wherein the predefined durations of time of the non-real-time capable operating system and of the real-time capable program complement each other to result in a cycle time being assigned to the processing unit.

12. A processor comprising:
   a plurality of processing units operating in parallel according to a control method, each processing unit being associated with a respective time signal generator upon the expiry of which the processing unit associated with the respective expired time signal generator is configured to:
  select a program from a plurality of programs available for execution,
  determine a predefined duration of time being provided to the selected program before the control method is accessed again by the processing unit associated with the respective expired time signal generator,
  set the respective expired time signal generator to the predefined duration of time, and
  determine whether an end of the predefined duration of time deviates less than a predefined length of time from a scheduled expiry of a time signal generator assigned to a different processing unit;
wherein, if the end of the predefined duration of time deviates less than the predefined length of time from the scheduled expiry of the time signal generator assigned to the different processing unit, the predefined duration of time is modified;
wherein scheduled expiry times of all the time signal generators are stored in a memory area which can be accessed by each of the plurality of processing units for preventing further accesses of the control method to another of the processing units when executing the control method on the processing unit associated with the respective expired time signal generator.

13. The processor of claim 12, wherein each time signal generator comprises a respective counter which is operated by a clock signal, each counter causing an interrupt in the processing unit assigned to it as soon as the counter reaches a predetermined value.

14. The processor of claim 13, wherein each counter comprises a respective programmable divider for dividing a clock signal shared by all dividers into one respective clock signal assigned to a counter.

15. The processor of claim 12, wherein each processing unit comprises a respective list, in which the programs assigned to the processing unit are listed.

16. The processor of claim 15, each entry in the list comprising a priority.

17. The processor of claim 15, a program is entered into one of the lists on the basis of a past capacity utilization of at least one of the processing unit.

* * * * *